Figure 1:
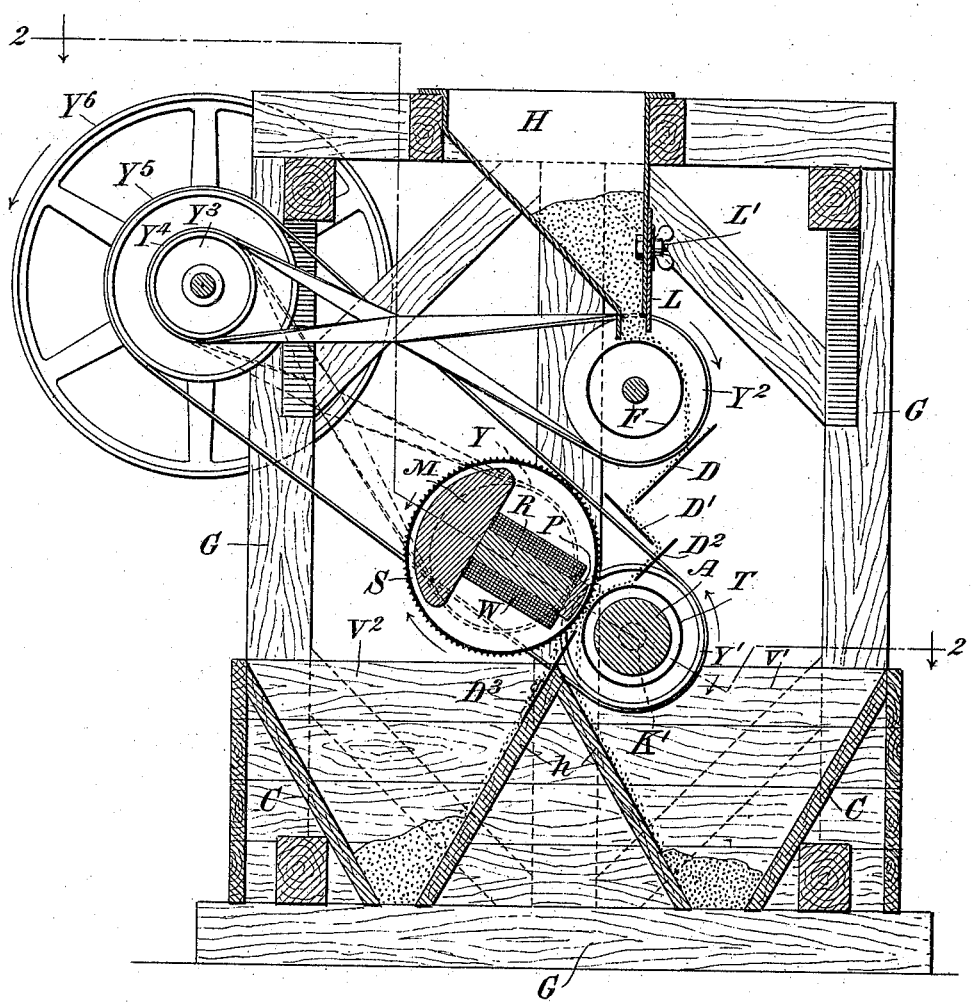

No. 641,220.  
C. Q. PAYNE.  
APPARATUS FOR MAGNETICALLY SEPARATING ORES.  
(Application filed Jan. 20, 1897.)  
Patented Jan. 9, 1900.

(No Model.) 5 Sheets—Sheet 1.

WITNESSES:  
C. E. Ashley  
H. W. Lloyd

INVENTOR:  
Clarence Q. Payne  
By his Attorney  
Willard Parker Butler

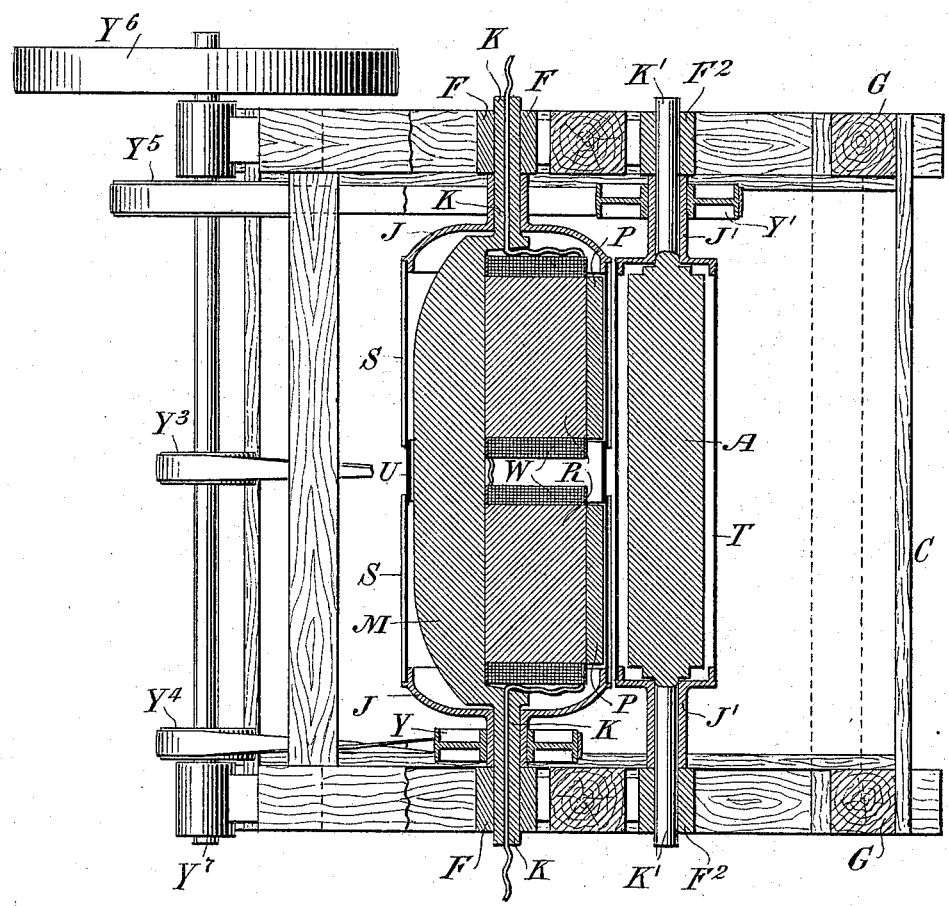

No. 641,220. Patented Jan. 9, 1900.
C. Q. PAYNE.
APPARATUS FOR MAGNETICALLY SEPARATING ORES.
(Application filed Jan. 20, 1897.)
(No Model.) 5 Sheets—Sheet 3.
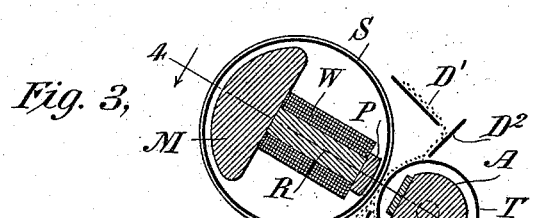
Fig. 3,
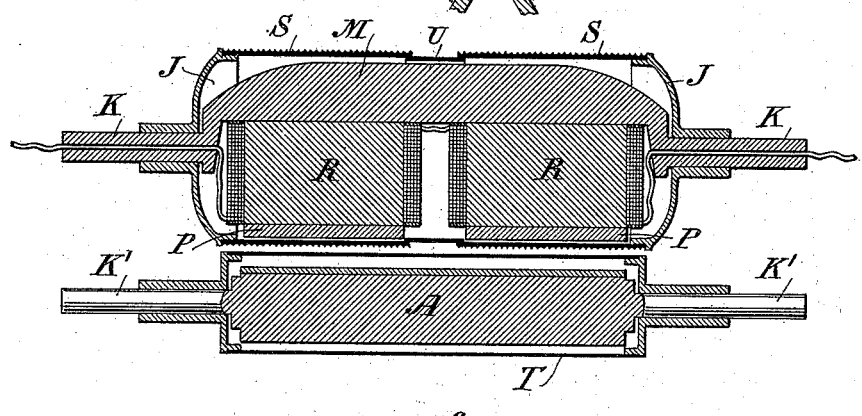
Fig. 4,
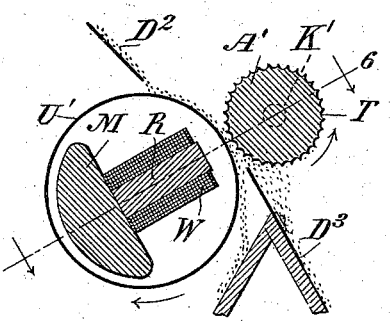
Fig. 5,
Fig. 6,
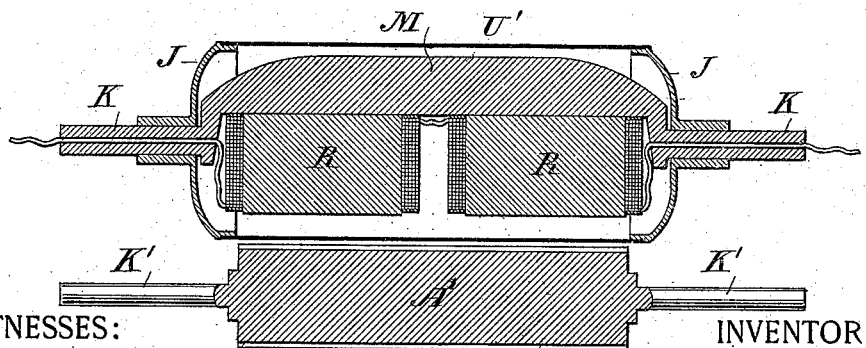
WITNESSES: INVENTOR:
C. E. Ashley Clarence Q. Payne
H. W. Lloyd. By his Attorney
Willard Parker Butler No. 641,220. Patented Jan. 9, 1900.
C. O. PAYNE.
APPARATUS FOR MAGNETICALLY SEPARATING ORES.
(Application filed Jan. 20, 1897.)
(No Model.) 5 Sheets—Sheet 4.

WITNESSES:
C. E. Ashley
H. O. Lloyd.

INVENTOR:
Clarence O. Payne
By his Attorney
Willard Parker Butler

No. 641,220. Patented Jan. 9, 1900.
C. Q. PAYNE.
APPARATUS FOR MAGNETICALLY SEPARATING ORES.
(Application filed Jan. 20, 1897.)
(No Model.) 5 Sheets—Sheet 5.
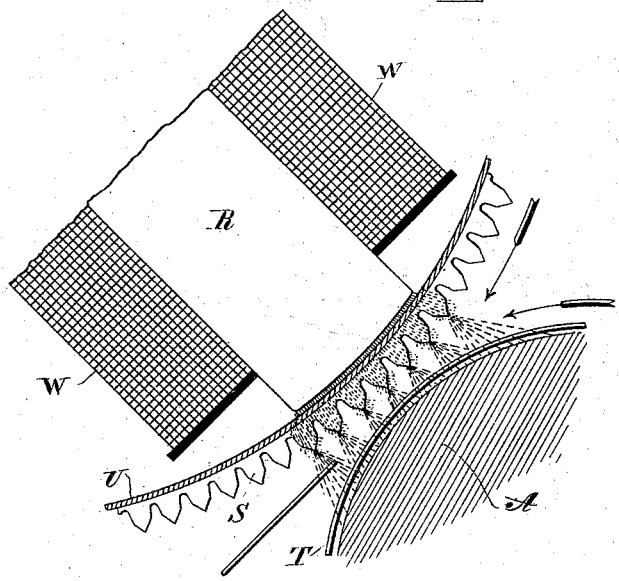
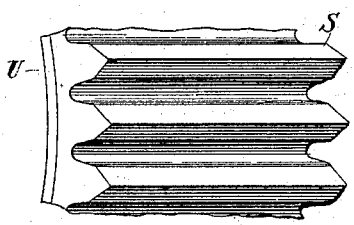
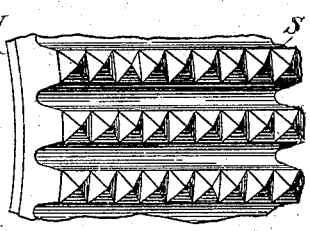

UNITED STATES PATENT OFFICE.

CLARENCE Q. PAYNE, OF STAMFORD, CONNECTICUT.

APPARATUS FOR MAGNETICALLY SEPARATING ORES.

SPECIFICATION forming part of Letters Patent No. 641,220, dated January 9, 1900.

Application filed January 20, 1897. Serial No. 619,881. (No model.)

*To all whom it may concern:*

Be it known that I, CLARENCE Q. PAYNE, a citizen of the United States of America, and a resident of Stamford, county of Fairfield, and State of Connecticut, have invented certain new and useful Improvements in Apparatus for Magnetically Separating Ores, of which the following is a specification.

My invention relates to improvements in magnetic separators for the concentration of substances of all degrees of magnetic susceptibility.

It consists, broadly, in improvements of means for controlling the positions or directions of the lines of force within a magnetic field, so as to obtain therein a very great extension of the range of magnetic intensity or effect.

The object of the present invention is to secure an extension of the scope of the magnetic separator as an ore-dressing machine, so as to secure not only a higher efficiency and economy in concentrating those iron ores which are naturally magnetic or may be rendered magnetic by roasting, but also to make it applicable to the separation of paramagnetic substances of all degrees of magnetic permeability from one another or from magnetic substances with which they may be mixed. This improvement of means is employed in connection with a magnetic field formed between opposing magnetic surfaces. Widely-different types of electromagnets may be utilized to produce such a magnetic field, and these may also be embodied in widely-different types of separating apparatus. In the present application the invention is shown and claimed in connection with an electromagnet of the horseshoe type and an armature so arranged that two magnetic fields are formed between them upon the same magnetic circuit.

The present invention will be best understood by reference to the accompanying five sheets of drawings, forming part of the specification, in which—

Figures 1 and 2 are sectional views of a complete operating-machine. Figs. 3, 4, 5, 6, 7, and 8 are sectional views showing alternative methods of constructing the electromagnets, armatures, separating-carriers, and feed-carriers. Fig. 9 is a diagrammatic section through the field of Fig. 1 on a larger scale. Figs. 10 and 11 show various ways of constructing the surface of the separating-carrier.

In order to present more clearly the nature of the present invention, it is desirable to employ certain terms in the sense usually accepted by electricians. For example, a "paramagnetic" substance is commonly considered to be one which when brought within a magnetic field causes the lines of force to become more dense within itself than in the surrounding medium—i. e., it is more permeable to them—while a "diamagnetic" substance, on the contrary, is one which in a like position causes the lines of force to become less dense within itself than in the surrounding medium—i. e. it is less permeable to them.

The important principle upon which the whole subject of magnetic separation is really based is that when a small paramagnetic particle which approximates a sphere in shape and is free to move is brought within a magnetic field which is not of uniform density it tends to move from a position of less to one of greater magnetic density, thus increasing the number of lines of force which pass through it. A diamagnetic substance, on the other hand, tends to move in an opposite direction. In a field of absolutely uniform magnetic density a paramagnetic substance of spherical shape does not tend to move in any direction whatever.

One aim of my invention, as illustrated in Fig. 9 and as described more fully hereinafter, is to establish locally the greatest possible differences of magnetic density within a magnetic field, so that not only substances of a high magnetic permeability, but also those of the lowest magnetic permeability as well, may be attracted and held while undergoing separation.

It has been heretofore considered necessary, following the practice adopted by Faraday and other investigators of this subject, to employ for the purpose of magnetizing those paramagnetic substances of low magnetic permeability—such as hematite, garnet, limonite, &c.—an electromagnet which secured a very highly condensed or concentrated magnetic field by means of very great magnetomotive force and by reduction of the core area of the electromagnet at the field-gap. By the exercise of my invention, however, I find that this is not necessary, and that simply by a more perfect control of the directions of the lines of force within a comparatively weak field, so as to widely vary the magnetic density therein, I am enabled to attract all those paramagnetic substances, even those of the lowest magnetic permeability, such as hematite, garnet, pyrites, &c. By employing the principle of my invention I have found, for example, that all these feebly-magnetic substances can be attracted and moved even within the field of force of a horseshoe steel hand-magnet, which, as far as I know, has not heretofore been considered possible.

In order to illustrate the principle involved in my invention, I have shown in Fig. 9 an enlarged section of the field shown in Fig. 1. Here the magnetic field is formed in the air-gap between two opposing and stationary magnetic surfaces—viz., R and A. A separating-carrier U S is made to pass through the field on one side thereof, and on the other side a feed-carrier T conveys the material to be separated into the field. The electromagnet and the armature, which are placed, respectively, on opposite sides of the air-gap, are so designed and disposed that the total magnetic flux generated by the electromagnet is made to pass through the air-gap. Since the lines of force all pass in the same direction within the field—i. e., do not reverse at any point—the field is of the so-called "unipolar" type. The air-gap is thus filled with lines of force which would occupy approximately parallel positions, as they are all within the same circuit of the magnetic flux, if they were not otherwise intercepted or diverted. The separating-carrier, however, is provided with a series of iron serrations or wedges S on its outer surface, and the inductive magnetization of these wedges causes by their shape a very great change in the relative positions or directions of the lines of force within the air-gap. While the size and shape of these wedges may be varied, it is an essential feature of my invention that their terminations may be brought to sharp edges. Having thus no appreciable areas, the wedge terminations may be considered approximately lines—that is, they have length without breadth. The inductive magnetization of the wedges and their shape cause the lines of force on passing through the separating-carrier to be intercepted and to be converged toward each of the wedge terminations which is within the field. They are then rapidly diverged or dispersed from the terminations across the remaining air-gap toward the armature-surface, as indicated by the broken lines in Fig. 9. I thus secure what may be called "line dispersions" of the flux density within the field. A very great accumulation of the lines of force at the wedge terminations is thus produced, since an edge or line cannot, as is well known, be saturated. The rapid dispersion of the lines of force thence toward the smooth surface of the armature A on the other side of the field produces great differences of magnetic density per unit of length in the direction of their dispersion. This difference of density at the limits of these divergences—viz., at the wedge terminations and at the armature-surface—being incommensurate is theoretically infinite. By this control over the positions of the lines of force within the field and by variations in the strength of the magnetomotive force I am able to obtain the widest possible range of magnetic effect in acting upon the magnetic particles to be separated. I have found it possible to employ in this way to the best advantage the principle which, as already pointed out, underlies the whole subject of magnetic separation—viz., that a magnetic particle when within a magnetic field tends to move only from a position of less to one of greater magnetic density.

Since an irregularly-shaped body, such as an ore particle, can usually be brought into contact with another body only at one or several points or along a line, it is evident that I am able to secure a variation through an almost indefinite range of the magnetic intensity within the field at the positions of contact of the ore particles with the wedge terminations by regulation of the magnetomotive force of the electromagnet and by the control of the directions of the lines of force, as explained above. In this way I obtain the highest economy of magnetizing effort in attracting those ores or minerals of a high magnetic permeability and am also able to act upon and separate those substances of a much lower magnetic permeability by the vast extension of the range of magnetic effect made possible by my invention. This control over the positions or directions of the lines of force within a magnetic field by line dispersions of the flux density therein secures also, when considered with reference to the effect in impressing work upon the ore particles, the greatest differences of magnetic potential within the field. The difference of magnetic potential between two points in a magnetic field is the measure of the work done—on an ore particle, for example—in moving it from one position to the other.

There are several directions in which the ore particles while undergoing separation may be made to move, depending upon the direction from which they are fed into the field. For example, if fed into the field upon the feed-carrier T (shown in Fig. 9) in the direction of the arrow the magnetic particles are attracted and made to move from one side of the field to the other in attaching themselves to the wedge terminations.

In a divisional application for Letters Patent founded on this present original application I have described and claimed a novel method of separating substances of all degrees of magnetic permeability from one another or from diamagnetic substances with which they may be mixed, which consists in acting upon them by means of undulations of magnetic potential, whereby they are caused to move in the direction just described, which produces very desirable separating effects in the case of certain classes of material. There are, however, other directions in which the ore particles may be made to move in such a field of undulating potential. For example, if the line 6 6, joining the centers of the electromagnet and armature of Fig. 5, be placed in a horizontal position the ore particles may then be fed directly upon the toothed surface of the revolving armature, and the motion of the magnetic particles is merely along the sides of the wedges until they reach the wedge terminations, where they are held while passing through the field. Moreover, when brought in direct contact with the wedge terminations while outside the field a magnetic particle would not necessarily have any relative motion within the field while passing through it.

As shown in Figs. 10 and 11, the surface of the separating-carrier S may be constructed in various ways to control the directions of the lines of force within the field in accordance with my invention. A series of separated pyramidal teeth or projections, as shown in Fig. 11, permits the greatest amount of control over the positions of the lines of force within the field—viz., in four directions—and secures thereby also the highest possible magnetic intensity at the pyramidal points. In general, however, and in order to secure as many positions of attachment for the material to be separated as possible it will be sufficient to employ a series of wedge terminations along the surface of the separating carrier or cylinder, as indicated in Fig. 10.

Referring now to Figs. 1 and 2, in which I have shown my invention embodied in a complete operating-machine, an electromagnet M R of the horseshoe type is here supported by shaft extensions K K at each end to the frame G G of the machine. These shaft extensions are held in suitable clamp-bearings F F, so that a rotary adjustment may be obtained in properly opposing the poles P P of the magnet to the armature A. The shaft extensions are bored out, as shown in Fig. 2, in order to lead the wires which convey an electric current to charge the field-coils W W through them. The cores of the electromagnet are extended close to the inner surface of the cylindrical separating-carrier S S by means of short pole-pieces P P, so as to leave only a slight clearance between them. The cylinder S S, within which the electromagnet is supported in a stationary position, is mounted at its ends upon drumheads J J, which revolve upon the shaft extensions K K and are preferably made of some non-magnetic material, such as bronze. The iron armature-bar A is supported parallel with the axis of the cylinder S S and at a short distance away from the poles P P of the electromagnet. The ends of the armature, reduced in diameter, are held in suitable clamp-bearings $F^2 F^2$, bolted to the frame of the machine. A feed-cylinder T incloses the armature A and is mounted upon drumheads J' J', which revolve freely upon the shaft extensions K' K'. This feed-cylinder for the most part is made of brass or other non-magnetic material, especially when used for the separation of strongly-magnetic material, such as magnetite, pyrrhotite, &c. It may, however, also be made of iron when used for the separation of very feebly magnetic material.

When the field-coils W W of the electromagnet are charged by means of an electric current from a dynamo-electric machine or other source, the lines of force generated by each of the cores R R form together a single closed magnetic circuit. The path of this circuit is through the electromagnet, the armature, and the two air-gaps. The two air-gaps between the opposing magnetic surfaces of the pole-pieces P P and of the armature A thus form, respectively, two separate unipolar magnetic fields, each of which is on the same circuit of the total magnetic flux. Each one of these magnetic fields is thus independently available for the purpose of ore separation. The distance between the feed-cylinder T and the separating-cylinder S may be varied by vertical and horizontal adjustments of the bearings $F^2 F^2$ in order to treat material when crushed to different sizes. The width of the air-gap itself may likewise be varied in this way and also by the use of iron bars of different thickness, which may be attached to the flattened surfaces of the armature, as shown in Figs. 3 and 4.

The separating-cylinder S S may be constructed in various ways. As already described in connection with Fig. 9, the essential feature consists in the use of the inductively-magnetized iron or mild-steel wedges or serrations upon the outer surface of the separating-cylinder. In the case of the horseshoe or two-pole electromagnet these wedges or serrations extend only along those portions of the cylinder which pass through the separate magnetic fields. The central portion of the cylinder U, which joins and supports the other portions of the cylinder, is preferably of non-magnetic material in order to avoid short-circuiting the field magnetism.

While the serrations or ridges of the iron portions of the separating-cylinder are preferably placed along rectilinear elements of the cylinder, as shown in Figs. 1 and 2, they may also be placed along curvilinear elements of the cylinder, as shown in Figs. 3 and 4. It is obvious that the exact manner of supporting the iron wedges upon the separating-cylinder may also be widely varied. For example, instead of using continuous iron rings with wedge-shaped ridges along rectilinear elements of the cylinder separated parallel iron rods may also be placed parallel with the axis of the cylinder and surrounding it.

In Figs. 5 and 6 I have shown an arrangement of the electromagnet and armature which I have found it convenient to employ for the separation of substances of various degrees of magnetic permeability. Here the armature is serrated and made to revolve. A serrated cylinder surrounding a stationary armature within it might also be employed. The material to be separated is then fed upon the cylinder U, which is of non-magnetic material. The material might also be fed upon the surface of the toothed armature itself, as already previously referred to. In that case the line joining the axis of the electromagnet and of the armature is preferably placed in a horizontal position.

Figure 7:
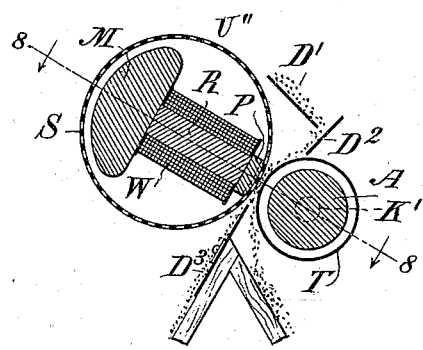
Figure 8:
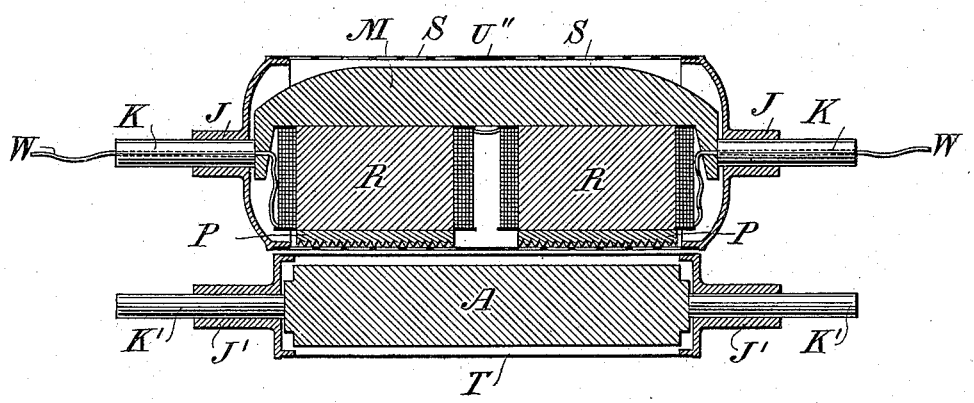

In Figs. 7 and 8 another construction is shown, in which the iron wedges or serrations are placed directly upon the pole-pieces P P. The separating-cylinder U is here made of non-magnetic material, such as brass, and is perforated along those portions of its surface which pass through the fields. When brought into the field by the feed-cylinder T, the magnetic particles on being attracted and held to the serrated pole-pieces are then removed by the scraping action of the drum-perforations which pass over the pole-pieces in contact with their outer surfaces.

While I have shown in the various illustrations, for the sake of simplicity, an electromagnet on one side of the two fields and an armature on the other, it is obvious that an electromagnet might be placed as well on both sides of the two fields. The same results, as far as the separating action is concerned, can be produced in both cases by line dispersion of the flux density within the air-gaps, and the fields in each case are formed between opposing magnetic surfaces.

The operation of the apparatus is as follows: Figs. 1 and 2 show a complete machine, and any one of the electromagnets, with its armature and operating-drums, shown in Figs. 3, 4, 5, 6, 7, and 8, may be substituted for the particular form of electromagnet, separating-carriers, armature, &c., shown in Figs. 1 and 2, the choice depending upon the size and magnetic susceptibility of the material which is to be separated. The coils of wire W W which surround the cores R R of the electromagnet are energized by means of an electric current, preferably from a dynamo-electric machine, and the separating-carrier S U S and feed-drum T are caused to revolve in the same or opposite directions in any convenient manner. In the drawings they are shown to be rotated in opposite directions by means of pulleys Y Y', keyed to the hubs of the drum-heads J and J' and driven by open and crossed belts from the counter-shaft $Y^7$, which is supported in bearings on the frame G G and is made to revolve from an outside source of power. Where the material to be separated is of a comparatively high magnetic susceptibility, the separating-carrier and feed-drum may be rotated in the same direction. The speed at which the two drums are revolved will depend somewhat upon the character of the material to be treated, since that which is strongly magnetic can be fed into the field and separated at a higher velocity than that which is only feebly magnetic. The bottom of the supply-hopper H is provided with two openings, below each of which there is a charging-drum F. The two charging-drums are mounted upon the same shaft and may be made to revolve by a belt and pulley driven from the shaft $Y^7$. The hopper is provided with adjustable gates, as shown in Fig. 1, so as to permit a regulated amount of ore to be conveyed by the charging-drums F to the guide-plates D, D', $D^2$, and $D^3$. These guide-plates allow the material to fall with as little momentum as possible upon the two portions of the feed-drum T which pass through the unipolar magnetic fields. Where the type of separating-carrier shown in Figs. 1, 2, or 3 and 4 is employed, the material treated is exposed in a unipolar field to the immediate and unobstructed action of line dispersions of the flux density within the field, and the difference of magnetic potential so produced causes the magnetic particles to be attracted away from the feed-cylinder T and held to the wedge terminations. By the rotation of the latter these particles are then carried through the field in planes parallel with the travel of the non-attracted particles, and at the end thereof when beyond the edge of the division-plate $D^3$ they are then discharged into the hopper $V^2$. The non-magnetic particles of the material treated remain upon the feed-drum T until carried to a point where they fall by gravity into the hopper V'. The position of the edge of the division-plate $D^3$ can be varied by either sliding or hinging the plate, so that in connection with the rotary adjustment of the electromagnet within its drum the magnetic and non-magnetic portions of the material can be deposited on opposite sides of the division-plate $D^3$ in their respective hoppers V' and $V^2$. Where the forms of electromagnet and toothed armature shown in Figs. 5 and 6 are used, the separating action is the same. Here the non-magnetic drum U' serves as a feed-drum for the material to be treated, though in some cases the material is fed directly upon the toothed armature A'. In such cases the drum U becomes unnecessary and may be replaced by two non-magnetic caps which cover only the core ends of the electromagnet and occupy somewhat more than one-half the space between the core ends and the armature.

While it is not essential to employ drums as means for feeding the material into the magnetic field and for conveying the products of the separation out of the field, they will usually be found advantageous on account of their mechanical simplicity in accomplishing the work required.

In separating crude material which contains a number of minerals, each of different magnetic susceptibility, the material, when properly crushed to mechanically disassociate the various minerals and sized, may be passed successively through a series of magnetic fields, in each of which the magnetomotive force and the width of the air-gap, as well as the form of the pole-pieces and separating-carriers, may be singly or jointly varied in order to adapt the separation in each case to the magnetic susceptibility of the particular mineral to be removed.

A comparatively coarsely crushed material containing magnetic minerals may be divided into the classes known as "heads," "middlings," and "tailings" by passing it successively through separate fields, each field being adjusted to the magnetic susceptibility of the particular class it is to treat. After a further crushing the middlings may then be repassed through the field for a final separation in accordance with well-known ore-dressing practice, and in certain cases both the heads and the tailings from the preliminary separation may be subjected likewise to a further separation, depending upon the nature of the associated minerals.

While the separating action of the present invention has been described with reference to the treatment of dry material, it is also possible by suitably inclosing the frame of the machine to immerse the electromagnet in water, so as to effect the separation of the material under water.

While I have herein described and shown several embodiments of my invention, yet I do not desire to be understood as confining my invention to said embodiments, as various modifications within the claims of my invention will readily suggest themselves to persons skilled in the separation of magnetizable materials from mixtures containing the same.

I claim as my invention—

1. In a magnetic separator, a magnetic field established in an air-gap between two opposing magnetic surfaces, in combination with a separating-carrier provided with means for producing a series of line dispersions of the flux density within said field, and means for moving said carrier through the field on one side thereof.

2. In a magnetic separator, an electromagnet and an oppositely-disposed inducing body separated therefrom by an interval constituting a magnetic field, in combination with means, adapted to pass between the magnet and inducing body, for producing wide differences of magnetic potential within the field between the two sides thereof, and means for feeding ore into the field, substantially as and for the purpose described.

3. In a magnetic separator, an electromagnet and an oppositely-disposed inducing body separated therefrom by an interval constituting a magnetic field, in combination with a separating-carrier traveling through the field between the magnet and the inducing body, and provided with means for intercepting and converging the lines of force at a series of separated locations upon the surface of the carrier, thereby inducing wide differences of magnetic potential in the field on the two sides thereof, substantially as and for the purpose described.

4. In a magnetic separator, an electromagnet, and an oppositely-disposed inducing body separated therefrom by an interval constituting a magnetic field, combined with a plurality of wedge terminations arranged to travel through the magnetic field, to establish wide differences of magnetic potential in a magnetic field between the two sides thereof, substantially as and for the purpose described.

5. In a magnetic separator, an electromagnet, and an oppositely-disposed inducing body separated therefrom by an interval constituting a magnetic field, in combination with an inductive carrier traveling through the field and between the electromagnet and inducing body, said carrier being provided with a plurality of wedge terminations on the side thereof nearest the inducing body, whereby the lines of force are magnetically intercepted and converged at those projections of the carrier which at that time pass through the field.

6. In a magnetic separator, an electromagnet, and an oppositely-disposed inducing body separated therefrom by an interval constituting a magnetic field; a rotating carrier provided with devices acting to induce wide differences of magnetic potential in the field between the two sides thereof; means for rotating said carrier, and a non-magnetic carrier between the inducing body and the magnetic carrier, substantially as and for the purpose described.

7. In a magnetic separator, the combination of an electromagnet and an oppositely-disposed inducing body separated therefrom by an interval constituting a magnetic field; a rotating magnetic cylinder surrounding the electromagnet, said cylinder being provided with a plurality of devices for establishing wide differences of magnetic potential in the field between the two sides thereof; means for rotating said cylinder; and a non-magnetic cylinder surrounding the inducing body.

8. In a magnetic separator, the combination of an electromagnet, and an oppositely-disposed inducing body separated therefrom by an interval constituting a magnetic field; a rotating magnetic carrier intercepting the lines of force in the magnetic field, said carrier being provided with a plurality of devices for establishing wide differences of magnetic potential in the field between the two sides thereof; means for operating said carrier; a non-magnetic carrier surrounding the inducing body; and a plate attachable to the inducing body for adjusting the width of the magnetic field, substantially as and for the purpose described.

9. In a magnetic separator, an electromagnet, and an oppositely-disposed inducing body, separated therefrom by an interval constituting a magnetic field, forming jointly the circuit for the total magnetic flux generated by the electromagnet, in combination with a separating-carrier traveling through said field, and provided with means for inducing wide differences of magnetic potential in the field on the two sides thereof, by intercepting and converging the lines of force at a series of wedge terminations upon the surface of the carrier, substantially as and for the purpose described.

10. In a magnetic separator, an electromagnet and an oppositely-disposed inducing body, separated therefrom by an interval constituting a magnetic field, in combination with a separating-carrier traveling through the field between the magnet and the inducing-body and arranged to intercept and magnetically induce wide differences of magnetic potential in the field between the two sides thereof, by opposing to the surface of the inducing body on one side of the field, a series of wedge terminations upon the separating-carrier on the other side of the field, substantially as and for the purpose described.

11. In a magnetic separator, a magnetic field formed between two opposing magnetic surfaces, in combination with a separating-carrier, passing through said field on one side thereof, and provided with a series of inductively-magnetized wedge terminations and a non-magnetic carrier also passing through said field on the other side thereof, substantially as and for the purposes described.

12. In a magnetic separator, an electromagnet, and an oppositely-disposed inducing body, separated therefrom by an interval constituting a magnetic field, in combination with a separating-carrier passing through said field, and provided with a series of wedge terminations which are successively opposed to said inducing surface as they pass through the magnetic field, substantially as and for the purpose described.

13. In a magnetic separator, the combination of means for creating two unipolar magnetic fields upon the same circuit; combined with two series of wedge terminations, each series arranged to travel through one of said magnetic fields, for inducing wide differences of magnetic potential in each of the fields between the two sides thereof; and means for moving said wedge terminations through the fields, substantially as and for the purpose described.

14. The combination of a suitably-energized electromagnet, an armature so arranged with reference thereto as to form two unipolar fields upon the same magnetic circuit; a separating-carrier provided with means for producing a series of line dispersions of the magnetic flux density within both of said fields; a feed-carrier for conveying the material to be separated into both fields, and means for moving the separating and feed carriers through both of said fields, substantially as described.

15. The combination of a suitably-energized electromagnet, an armature so arranged with reference thereto as to form two unipolar magnetic fields upon the same magnetic circuit; a rotating cylinder surrounding the armature for conveying the material to be separated into both fields, and an inductively-magnetized carrier for removing the magnetic portion of the material, provided with means for causing a series of parallel wedge-shaped convergences of the lines of force in both of said fields.

16. The combination of a suitably-energized electromagnet, a cylindrical armature so arranged with reference thereto as to form two unipolar magnetic fields upon the same magnetic circuit; a non-magnetic cylinder surrounding the armature for conveying the material to be separated into both fields, and a carrier surrounding and arranged to rotate around the electromagnet, composed of a central non-magnetic portion, and two independent inductively-magnetized iron portions, each of which passes through one of the unipolar fields, and is provided with a series of parallel wedge terminations for removing the magnetic portion of the material attracted by the electromagnet.

17. The combination of a suitably-energized electromagnet; means for extending the cores of the electromagnet; an armature so arranged with reference thereto as to form two unipolar fields upon the same magnetic circuit; means connected with the armature for adjusting the width of the air-gap between it and the electromagnet; an inductively-magnetized carrier surrounding the electromagnet provided with a series of wedge terminations upon the outer surface of the carrier; and a non-magnetic cylinder.

18. The combination of a suitably-energized electromagnet; suitable pole-pieces for extending the cores of the electromagnet; an armature so arranged with reference thereto as to form two unipolar magnetic fields upon the same magnetic circuit; a removable plate attached to the armature for adjusting the width of the air-gap between it and the electromagnet; a rotating magnetic carrier surrounding the electromagnet, provided with wedge terminations and a non-magnetic screen surrounding the armature, both the magnetic carrier and the non-magnetic carrier being arranged to rotate through both of said fields.

19. The combination of a suitably-energized electromagnet provided with suitable pole-pieces for extending the cores thereof, a rotating iron separating-carrier surrounding said electromagnet provided with wedge terminations upon its outer surface; an armature so arranged with reference to the electromagnet as to form two unipolar fields upon the same magnetic circuit, plates of different thicknesses attachable to the armature for adjusting the width of the air-gap between it and the electromagnet and a non-magnetic feed-screen surrounding the armature arranged to rotate through both of said fields.

20. The combination of an electromagnet composed of two cores suitably energized connected by a back piece extending beyond the cores and terminating in hollow shafts through which the wires conveying the current are admitted; suitable pole-pieces for extending the cores of the electromagnet; a separating-carrier surrounding said electromagnet rotating on the shafts of said extending back piece, provided with wedge terminations upon its outer surface; an armature terminating at both ends in shafts, so arranged with reference to the electromagnet as to form two unipolar fields upon the same magnetic circuit; plates of different thicknesses attachable to the armature for adjusting the width of the air-gap between it and the electromagnet; and a non-magnetic feed-screen surrounding the armature arranged to rotate on the shaft extensions of the armature through both of said unipolar fields.

21. The combination of an electromagnet composed of two cores suitably energized connected by a back piece extending beyond the cores and terminating in shafts; suitable pole-pieces for extending the cores of the electromagnet; a separating-screen rotating on said extended back-piece shafts composed of two magnetic portions connected by a central non-magnetic portion, the magnetic portions being provided with wedge terminations upon their outer surfaces; an armature, so arranged with reference to the electromagnet as to form two unipolar fields on the same magnetic circuit, provided with shaft extensions at each end, plates of different thicknesses attachable to the armature for adjusting the width of the air-gap between it and the electromagnet; a non-magnetic feed-screen surrounding the armature and rotating on said shafts formed by the extensions of the armature; and means for rotating said screens.

In testimony that I claim the foregoing as my invention I have signed my name, in presence of two witnesses, this 19th day of January, 1897.

CLARENCE Q. PAYNE.

Witnesses:
  WILLARD PARKER BUTLER,
  JOHN FRENCH.